Sept. 7, 1926.  
J. N. SELVIG  
1,598,937  
CORD OR STRAND OPERATING MECHANISM  
Original Filed March 7, 1922  3 Sheets-Sheet 2
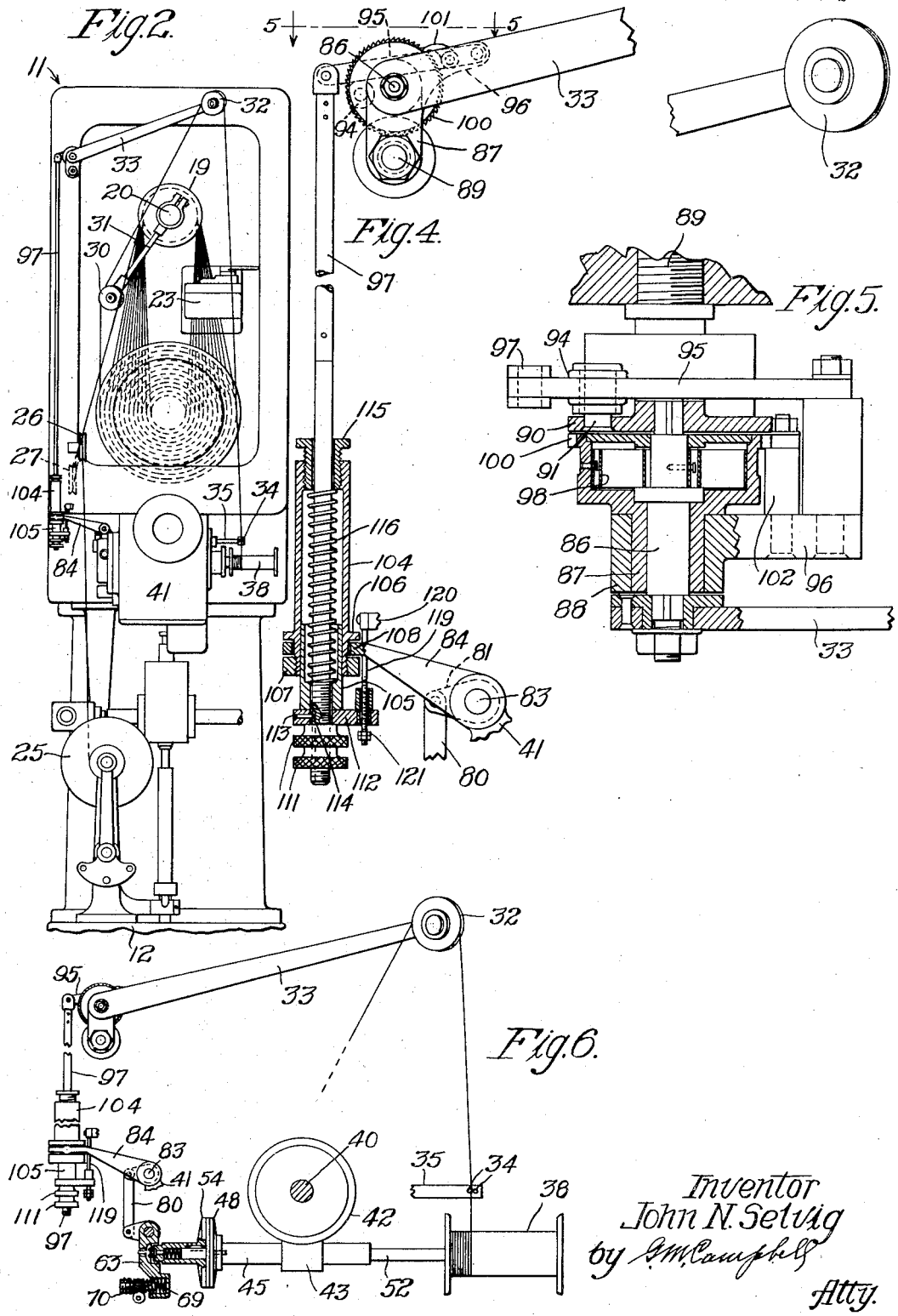
Inventor
John N. Selvig
by G. M. Campbell
Atty.

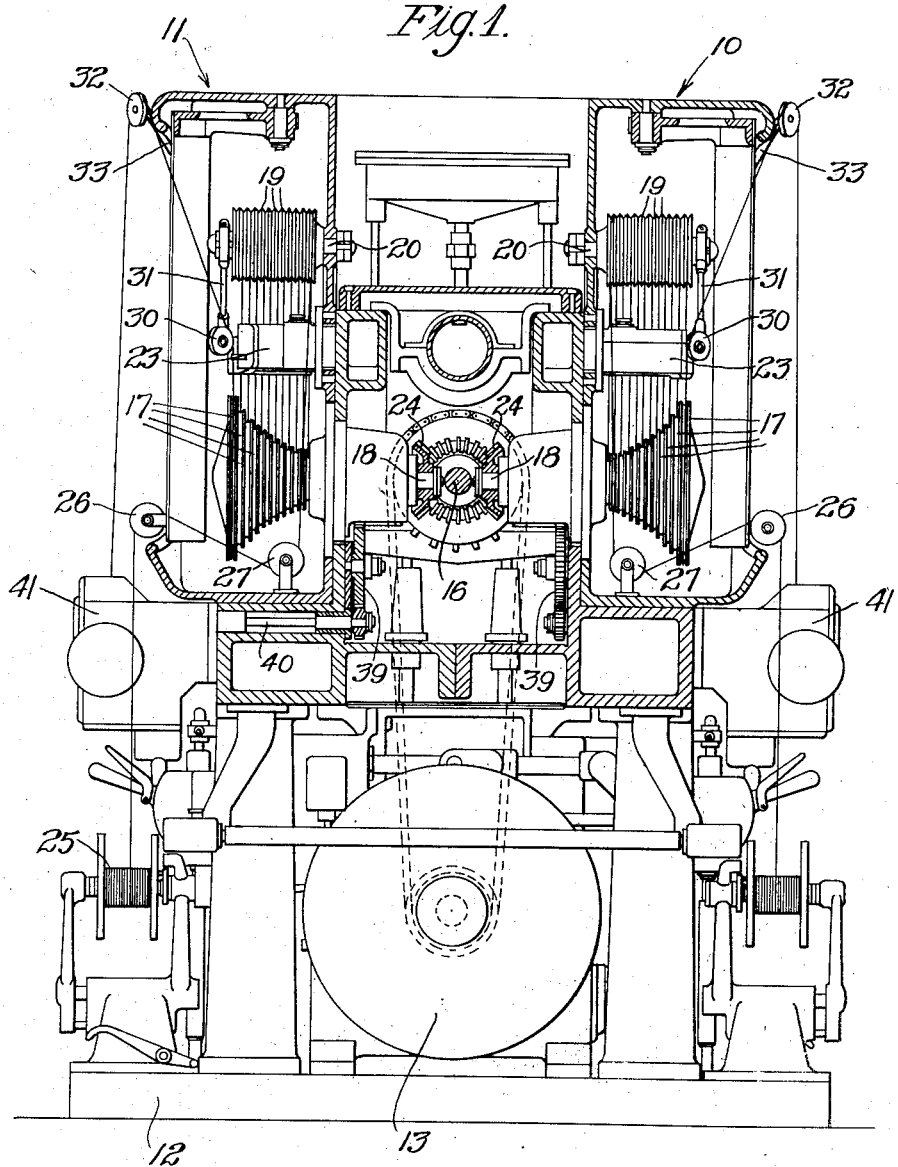

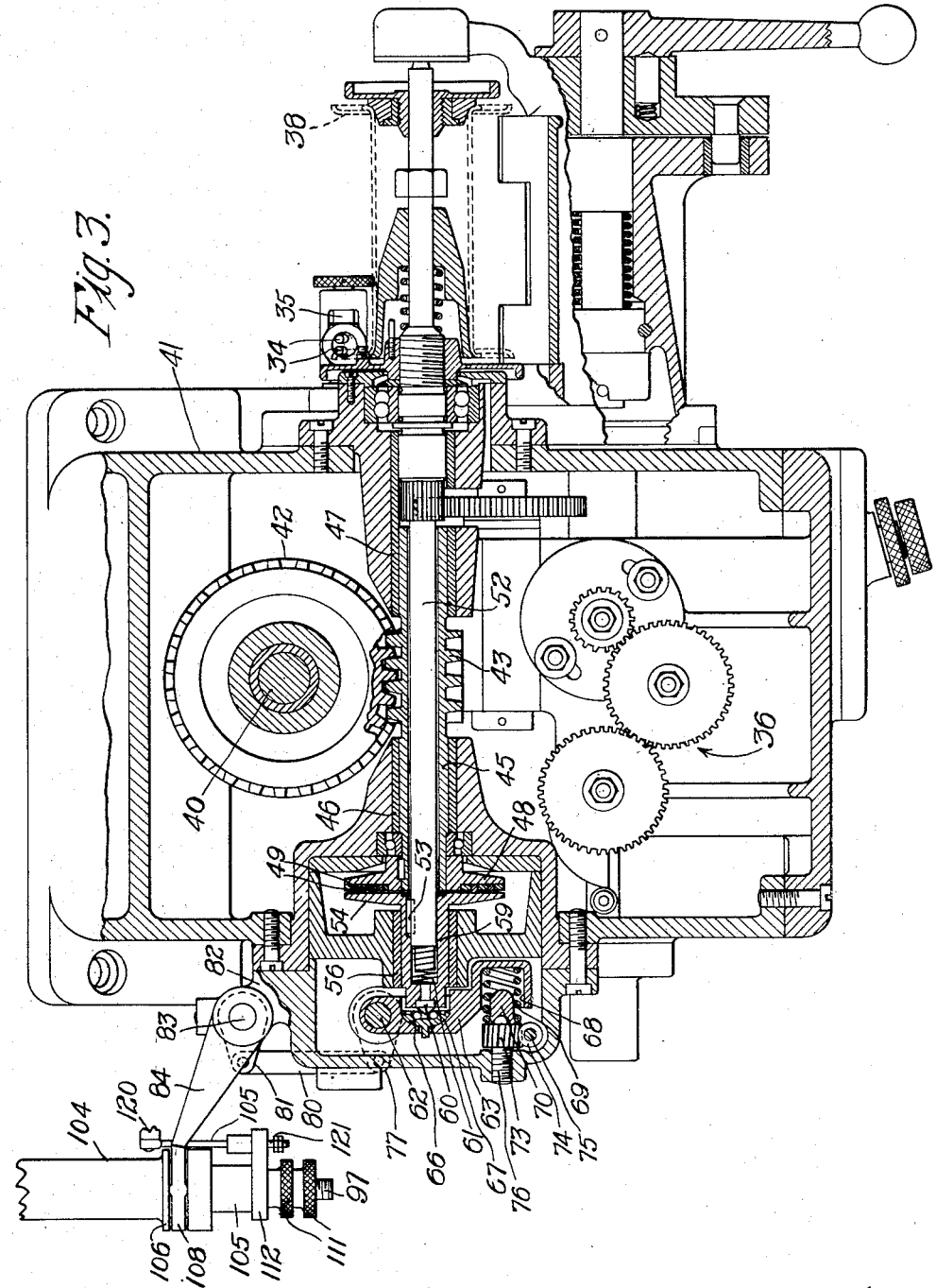

Patented Sept. 7, 1926.

1,598,937

UNITED STATES PATENT OFFICE.

JOHN NILSEN SELVIG, OF CHICAGO, ILLINOIS, ASSIGNOR TO WESTERN ELECTRIC COMPANY, INCORPORATED, OF NEW YORK, N. Y., A CORPORATION OF NEW YORK.

CORD OR STRAND OPERATING MECHANISM.

Application filed March 7, 1922, Serial No. 541,633. Renewed December 3, 1925.

This invention relates to cord or strand operating mechanism, and more particularly to a tension regulating means for such mechanisms.

The object of the invention is to provide a means for controlling the speed of a take-up spool, which means will be particularly sensitive to slight variations in tension upon the strand being wound, whereby delicate strands or cords may be wound at a high rate of speed without danger of breakage.

In the preferred form of this invention the take-up spool for the strand or cord is mounted upon a spindle connected through friction disk clutch members with a constantly rotating driving mechanism, the clutch members being constantly engaged face to face with each other but variable as to pressure between them, which variation in pressure is controlled through the agency of levers responsive to variations in the tension of the cord or strand which is being wound upon the take-up spool or reel.

More specifically the invention comprises a driven sleeve carrying a disk clutch member upon one end of which is adapted to engage a second disk clutch member splined upon a spindle extending through the sleeve and rotatable independently thereof, except through the clutch members. The spindle carries the take-up spool, and the engagement of the clutch faces is controlled by a series of delicately balanced levers one of which carries a pulley over which the drawn wire runs from the drawing die to the take-up spool. Associated with the levers and forming an operative connection therebetween is a yieldable member. Due to the yieldable connection between the levers the least variation in tension in the wire being spooled results in a corresponding change in pressure between the faces of the friction disks.

As the tension on the wire decreases, the clutch members are brought into more intimate contact by pressure applied at this instant to speed up the take-up spool. As the tension on the wire increases, the pressure between the clutch members is diminished to diminish the speed of the spool. Means are also provided for adjusting the initial pressure between the clutch faces to suit the size of wire being reeled.

In the drawings in which this invention is illustrated in connection with a wire drawing machine:

Fig. 1 is a side elevation partly in section of a wire drawing machine embodying the features of the invention;

Fig. 2 is a front elevation thereof looking toward the right with the base member partly broken away;

Fig. 3 is an enlarged vertical section through the take-up drive mechanism showing the clutch in section and a portion of the clutch controlling mechanism in elevation;

Fig. 4 is an enlarged fragmentary elevation of the clutch controlling mechanism as viewed in Fig. 2 with a portion thereof in section;

Fig. 5 is an enlarged plan detail partly in section of the portion indicated between the arrows 5—5 of Fig. 4, and Fig. 6 is an enlarged skeleton view partly in section of the clutch controlling mechanism and the take-up drive.

The wire drawing machine illustrated in the drawings to which the invention has been applied comprises two vertically disposed units 10 and 11 positioned back to back and carried upon a single base member 12. Mounted on the base 12 between the two units is a driving motor 13 and positioned directly thereabove and suitably driven thereby is a horizontally disposed main drive shaft 16. Each of the units 10 and 11 is identical in construction and includes a plurality of capstans 17, 17 of different diameters secured to a horizontal shaft 18. Above the shaft 18 are a plurality of sheaves 19, 19 independently rotatable upon a shaft or support 20 secured to the frame of the unit. Intermediate the capstans 17, 17 and the sheaves 19, 19 is a die holder 23 which carries a plurality of wire drawing dies. The capstan shaft 18 is driven from the main shaft 16 by bevel gearing indicated at 24. A supply of wire 25 to be reduced in diameter is suitably carried at the front of the unit and near the base member 12. The wire 25 is guided from its supply spool over and under pulleys 26 and 27 respectively and then over the rear sheave 19 upon the support 20 and through the first reducing die in the die holder 23. After leaving the first die the wire is wound once around the capstan 17 of smallest diameter, after which it is passed upward and over the next sheave 19 and through the next reducing die and around the next capstan, etc., until it is finally drawn down to the correct diameter by the last reducing die. From the final reducing die the drawn wire passes around the capstan 17 of largest diameter at a constant speed and is guided by a pulley 30 mounted on a stationary arm 31 adjustably positioned upon the support 20 to a pulley 32 carried upon a lever 33. After passing over the pulley 32 the wire is led between two distributing fingers 34 carried upon a reciprocable arm 35. The arm 35 is reciprocated back and forth in a horizontal direction by suitable driving mechanism indicated at 36 connected with the main drive shaft 18 to distribute the wire in even layers upon a take-up spool 38 indicated in dotted outline in Fig. 3. Suitable gearing indicated at 39 driven by the capstan shaft 18 drives a horizontal shaft 40 positioned a short distance below the shaft 18 at a suitable speed. The shaft 40 extends forward into a take-up drive housing 41 and at its end carries a worm gear 42 (see Fig. 3) which is in engagement with a worm 43 formed on a sleeve 45 rotatable in bearings 46 and 47. The end of the sleeve near the bearing 46 has secured thereto a disk clutch member 48 provided on its engaging face with cork or other suitable inserts 49. Extending through the sleeve 45 and rotatable independently thereof is a spindle 52 having splined thereon, as indicated at 53, a disk clutch member 54. The spindle 52 at its opposite end is provided with suitable means for carrying the take-up spool 38. The clutch end of the spindle 52 is supported in a bearing 56 while the opposite end is supported by the bearing 47. The clutch member 54 is cup-shaped, as indicated at 59, at the rear of its engaging face and its end wall is equipped with a hardened steel pin 60 provided with a cone shaped head which projects outside the end wall thereof and in line with its axis. Between the end wall of the cup-shaped portion 59 and the end of the spindle 52 upon which the member 54 is movable in a longitudinal direction is a compression spring 61 acting in a direction to separate the engaging faces of the clutch member 48 and 54 when pressure which acts in the reverse direction is diminished. Secured to a shaft 62 positioned above the spindle 52 and having its bearings in the take-up drive housing 41 is a recessed arm 63. The arm 63 is positioned on the shaft 62 directly in line with the axis of the spindle 52 and is provided with a recess 66 within which is fitted an anti-friction thrust bearing 67.

The cone shaped head of the pin 60 rides in the thrust bearing 67 and is always in engagement therewith under varying degrees of pressure. Below the recess 66 and in vertical alinement therewith is a second recess 68 formed in the arm 63 from the opposite side. Within the recess 68 is a compression spring 69 adapted to be put under varying degrees of compression by an adjustable pin 70 in engagement with the opposite end thereof. The pin 70 is equipped with a spiral gear 73 which engages a spiral pinion 74 mounted on a shaft 75 which projects outside the housing 41 and is equipped with a suitable handle (not shown) for revolving it. The supporting end 76 of the pin 70 is screw threaded into the housing 41 and as the pinion 74 is turned, it will in turn cause the gear 73 to revolve and consequently the pin 70 will be turned to either increase or decrease the compression of the spring 69 to vary the pressure between the thrust bearing 67 and the cone shaped end of the pin 60 carried by the clutch member 54.

The compression of the spring 69 is changed only when a different size wire is to be spooled. One end of the shaft 62 projects outside of the housing 41 and has secured thereto an arm 77 pivotally connected at its end to an upwardly extending link 80. The link 80 at its upper end is pivotally connected to an arm 81 similar to the arm 77. Mounted to turn in a bracket 82 formed on the top of the housing 41 and in alinement with the shaft 62 is a shaft 83 which has secured at one end thereof the arm 81 and at its opposite end an arm 84.

The lever 33 carrying the pulley 32 is suitably secured to a pin 86 mounted to turn upon a sleeve portion of a housing 87 (see Figs. 4 and 5). The housing 87 is supported from a bracket 88 secured to a pin 89 carried from the frame of the machine. At the rear of the housing 87 is a disk 90 secured to the pin 86 to turn therewith. Rotatably mounted upon a pin 91 projecting from the rear face of the disk 90 is a roller 94. The roller 94 is positioned upon the disk 90 near its periphery and below a horizontal line drawn through the axis thereof. Resting upon the roller 94 is a link 95 pivotally connected at one end to an extended portion 96 of the bracket 88 and at its opposite end to a downwardly extending link 97. The lever 33 is held up by a clock spring 98 mounted within the housing 87. One end of the spring 98 is secured to the revolvable housing 87 and its other end to the pin 86 which supports the lever 33. Formed on the housing 87 is a ratchet 100 retained in its set position by a pawl 101 pivoted on a post 102 carried by the portion 96 of the bracket 88. The spring 98 acting on the lever arm 33 keeps the wire under the proper tension to insure smooth and even spooling thereof on the take-up spool 38 without causing a breakage of the wire. The tension to be used is determined by the size of the wire to be drawn. To regulate the tension the housing is turned one way or the other, which will either decrease or increase the tension of the spring 98 and the pawl 101 will retain the ratchet 100 on the housing 87 in its set position.

The downwardly extending link 97 passes through a telescopic spring housing composed of two members 104 and 105.

Formed on the member 104 adjacent its lower end is a circular flange 106. Screw threaded onto the member 104 below the flange 106 is a collar 107 and between the flange 106 and the collar 107 is positioned an eye 108 formed on the end of the arm 84 supported from the housing 41.

The lower end of the link 97 is fitted with two thumb screws 111 and between the end of the member 105 and the upper thumb screw 111 is a plate 112 loosely mounted around the link 97 adapted to be moved vertically with respect thereto but prevented from turning thereon by a pin 113 carried in the plate 112 and projecting into a slot 114 formed in the link 97. Screw threaded into the upper end of the member 104 is a plug 115 through which the link 97 is free to move.

Positioned around the link 97 within the telescopic housing and resting against the plug 115 at one end and a shoulder formed on the member 105 at its other end is a compression spring 116 the tension of which can be decreased or increased by turning the thumb screws 111 one way or the other. Passing loosely through the plate 112 is a rod 119 connected at its upper end to a lever 120. Screw threaded onto its lower end a short distance below the bottom face of the plate 112 is an adjustable stop collar 121. Whenever the wire being drawn breaks, the plate 112 will be moved down due to the action of the springs 98 and 116 and into engagement with the stop collar 121 and thereby cause the rod 119 to be moved downward. The downward movement of the rod 119 causes the lever 120 to trip a trigger (not shown) which causes the machine to stop.

In the operation of the wire drawing machine the capstans 17, 17 deliver the wire to the take-up spool 38 at a constant speed and the speed at which the wire may be drawn through the dies is dependent upon the speed at which the wire may be taken up. To take up the wire successfully at a high speed, the tension on the wire must be maintained substantially constant. In starting and stopping the machine and during the spooling of the wire the tension on the wire will vary momentarily. During the spooling of the wire the diameter of the take-up spool increases as each layer is wound thereon and in a case where the dies are delivering drawn wire at the rate of approximately 2500 feet per minute, the take-up spool must be driven at speeds varying from approximately 5000 to 10,000 R. P. M. in order to compensate for the varying diameters of the take-up spool and maintain a constant tension on the wire to insure uniform spooling thereof on the take-up spool. When the tension upon the wire is increased above the proper tension during spooling, the free end of the lever 33 will be moved down against the action of the clock spring 98. This movement of the lever 33 moves the roller 94 in a clockwise direction and lifts the link 95, thereby causing the leverage acting against the spring 69 to be increased through the spring 116. The pressure between the thrust bearing 67 and the cone shaped head on the pin 60 will thereby be diminished and the force stored in the spring 61 now acts to diminish the pressure between the clutch members 54 and 48 resulting in the slowing up of the take-up spool 38 due to the clutch member 54 slipping on the clutch member 48.

When the tension on the wire is decreased below the proper tension, the lever 33 moves upward in response to the action of the clock spring 98. This movement of the lever 33 moves the roller 94 in a direction away from the link 95, which causes the leverage acting against the spring 69 through the spring 116 to be diminished. The spring 69 now acts to press the thrust bearing 67 carried in the arm 63 against the cone shaped head on the pin 60 with greater pressure, thereby increasing the tractive force of the clutch member 48 against the clutch member 54 and results in the speeding up of the take-up spool 38 until the tension on the wire is again normal.

As the tension on the wire between the capstan 17 and the take-up spool 38 varies, the pressure between the clutch members 48 and 54 will vary in response thereto and cause a change in speed of the take-up spool accordingly. Due to the change in pressure between the members 48 and 54 in response to the tension on the wire, a substantially constant tension is maintained on the wire thereby allowing the machine to be run at high speed without breakage of the wire and with accurate spooling of the drawn wire on the take-up spool.

What is claimed is:

1. In a mechanism for winding strands, a take-up spool, friction driving means for the take-up spool, a pivotal lever over which the strand runs to the take-up spool, and an elastic leverage mechanism operatively connected to said pivotal lever and with said friction driving means to vary the driving pressure thereof in response to variations in the tension of the strand.

2. In a mechanism for winding strands, a take-up spool, friction driving means for the take-up spool, a pivotal lever over which the strand runs to the take-up spool, and an elastic leverage mechanism connected at one end with said lever and at its opposite end with said friction driving means to vary the driving pressure thereof in response to variations in the tension of the strand.

3. In a mechanism for winding strands, a take-up spool, friction driving means for the take-up spool, a pivotal tensioned lever over which the strand runs to the take-up spool, and an elastic leverage mechanism operatively connected at one end with the pivotal end of said tensioned lever and at its opposite end with said friction driving means to vary the driving pressure thereof in response to variations in the tension of the strand.

4. In a mechanism for winding strands, a take-up spool, power driving means for the take-up spool including friction disks engaging each other face to face, a pressure spring for maintaining said disks in driving engagement, a pivotal tensioned lever over which the strand runs from the supply spool, and a leverage mechanism including an elastic member operatively connected to said tensioned lever and with said pressure spring to vary the pressure thereof and thereby the contact pressure of said friction disks in response to variations in the tension of the strand.

5. In a mechanism for winding strands, a take-up spool, power driving means for the take-up spool including friction disks, a pressure spring for maintaining said disks in driving engagement, a pivotal tensioned lever over which the strand runs to the take-up spool, and a leverage mechanism including an elastic member adapted to resist pressure operatively connected to said tensioned lever and with said pressure spring to vary the pressure thereof and thereby the driving pressure of said friction disks in response to variations in the tension of the strand.

6. In a mechanism for winding strands, a take-up spool, friction driving means for the take-up spool, a pressure spring for maintaining said friction driving means in engagement, a pivotal tensioned lever over which the strand runs to the take-up spool, a leverage mechanism including a link operatively connected at one end to said tensioned lever, the other end thereof adapted to support an elastic member, and supporting means against which one end of said elastic member rests under tension, said supporting means operatively connected to said pressure spring whereby any movement of said pivotal tensioned lever in response to variations in the tension of the strand is transmitted through said elastic member to vary the pressure of said pressure spring and thereby the driving pressure of said friction driving means.

7. In a mechanism for reeling strands, a take-up reel, a spindle therefor, driving mechanism rotating at a constant speed, a pair of friction disk clutch members engaged face to face and interposed between the spindle and the driving mechanism, a system of levers controlled by the tension in the strand for varying the pressure between the disk clutch members, and compensating springs in the lever system to take care of slight variations in the tension of the strand.

8. In a mechanism for winding strands, a take-up spool, a spindle therefor, driving mechanism, a pair of friction disk clutch members engaged face to face and interposed between the spindle and the driving mechanism, a pivotal arm bearing against one of said friction members, a pressure spring acting on said arm to keep said friction members in engagement, and levers including an elastic member controlled by the tension of the strand operatively connected to said pivotal arm to vary the pressure of said pressure spring and thereby the contact pressure of said friction disk clutch members in response to variations in the tension of the strand.

9. In a mechanism for winding strands, a take-up spool, a spindle therefor, driving mechanism, a pair of friction disk clutch members engaged face to face and interposed between the spindle and the driving mechanism, an arm pivotally mounted above the axis of said friction members and bearing in a direction parallel to the axis of and against one of said friction members, a pressure spring acting on said arm at a point below the axis of said friction members to keep said friction members in engagement, and levers including a yieldable member controlled by the tension of the strand operatively connected to said pivotal arm to vary the pressure of said pressure spring and thereby the contact pressure of said friction disk clutch members in response to variations in the tension of the strand.

10. In a mechanism for winding strands, a take-up spool, friction driving means for the take-up spool, a pressure spring for maintaining said friction driving means in engagement, a pivotal lever over which the strand runs to the take-up spool, a roller mounted eccentrically of the pivot point thereof and adapted to be moved concentrically thereof by the movement of said pivotal lever, a support for said pivotal lever, a second lever pivotally carried by said support and resting on said roller, and a yieldable leverage mechanism connected at one end with said second lever and at its opposite end with said pressure spring to vary the pressure thereof and thereby the driving pressure of said friction means in response to variations in the tension of the strand.

11. In a mechanism for winding strands, a take-up spool, friction driving means for the take-up spool, a pressure spring for maintaining said friction driving means in engagement, a pivotal lever over which the strand runs to the take-up spool, a leverage mechanism including a link operatively connected at one end to said pivotal lever, the other end adapted to support a sleeve member, a compression spring around said link and resting on said sleeve member, a second sleeve member slidably mounted on said first sleeve member and said link and adapted to support the opposite end of said compression spring, said second sleeve member operatively connected to said pressure spring whereby any movement of said pivotal lever in response to variations in the tension of the strand is transmitted through said compression spring to vary the pressure thereof and thereby the driving pressure of said friction means in response to variations in the tension of the strand.

12. In a mechanism for winding strands, a take-up spool, friction driving mechanism for the take-up spool, an element over which the strand runs to the take-up spool, and an elastic leverage mechanism operatively connected to said element and with said friction driving means to vary the driving pressure thereof in response to variations in the tension of the strand.

13. In a mechanism for winding strands, a take-up spool, friction driving means for the take-up spool, a tensioned element over which the strand runs to the take-up spool, and an elastic leverage mechanism operatively connected to one end of the tensioned element and at its opposite end with the friction driving means to vary the driving pressure thereof in response to variations in the tension of the strand.

14. In a mechanism for winding strands, a take-up spool, friction driving means for the take-up spool, a tension element over which the strand runs to the take-up spool, an elastic leverage mechanism operatively connected to one end of the tensioned element and at its opposite end with the friction driving means to vary the driving pressure thereof in response to variations in the tension of the strand, and compensating springs in the leverage system to take care of slight variations in the tension of the strand.

In witness whereof, I hereunto subscribe my name this 21st day of February A. D., 1922.

JOHN NILSEN SELVIG.